(No Model.)
A. H. BARTH.
CUT-OFF AND STRAINER ATTACHMENT FOR RAIN WATER SPOUTS.
No. 527,400.  Patented Oct. 16, 1894.
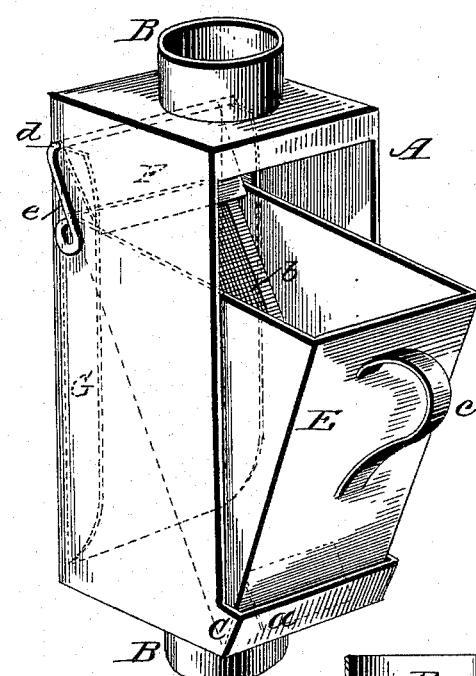
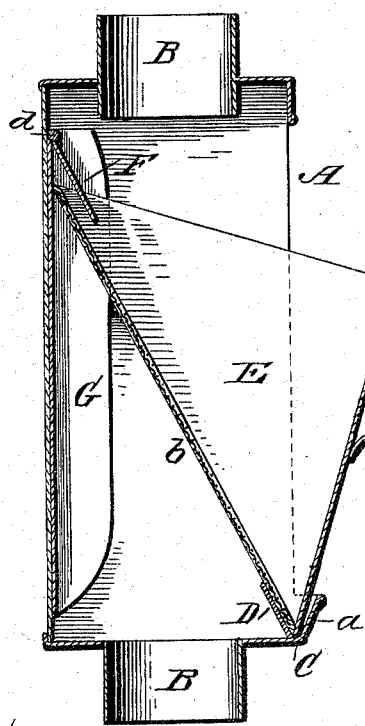
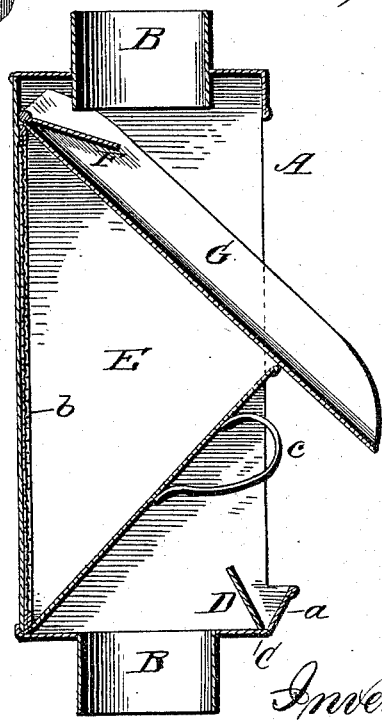
Witnesses
E. J. Williamson
Geo. Brooks
Inventor
Alfred H. Barth,
per Chas. N. Fowler
Attorney.

UNITED STATES PATENT OFFICE.

ALFRED H. BARTH, OF LAMAR, MISSOURI.

CUT-OFF AND STRAINER ATTACHMENT FOR RAIN-WATER SPOUTS.

SPECIFICATION forming part of Letters Patent No. 527,400, dated October 16, 1894.

Application filed May 5, 1894. Serial No. 510,165. (No model.)

*To all whom it may concern:*

Be it known that I, ALFRED H. BARTH, a citizen of the United States, residing at Lamar, in the county of Barton and State of Missouri, have invented certain new and useful Improvements in Cut-Off and Strainer Attachments for Rain-Water Spouts; and I do hereby declare that the following is a full, clear, and exact description of the same, reference being had to the annexed drawings, making a part of this specification, and to the letters of reference marked thereon.

The present invention has relation to that class of devices or attachments to rain-water spouts whereby the water may be relieved of any impurities previous to its being conducted to the cistern or other receptacle or the course of the water changed as found most desirable.

The invention consists of a cut-off and strainer attachment to a rain-water spout constructed substantially as shown in the drawings and hereinafter described and claimed.

Figure 1 of the drawings represents a perspective view of my improved device showing the strainer brought into position to strain the rain-water previous to its passing into the cistern; Fig. 2, a vertical central section thereof; Fig. 3, a similar view showing the strainer thrown back out of position and the cut-off brought into use to conduct the water away from the cistern to prevent overflowing thereof.

In the accompanying drawings A represents the cut-off box which may be of any suitable construction and provided respectively at its top and bottom with coupling sleeves or collars B to form a connection between the cut-off box and spout-conductors. The box A has an open front and at the bottom of the box is an outwardly projecting support C provided with the bearing flange $a$, and in the rear of this flange is a brace D. The flange $a$ and brace D are disposed on an incline which form together a V-shape support to hold the funnel shaped filter or strainer E in position, as shown in Figs. 1 and 2. The wire gauze as shown at $b$ is connected to one side of the funnel and said funnel is provided with a suitable handle $c$ for convenience of adjustment.

When it is desired to strain the water previous to its entering the cistern, the funnel shaped strainer E is in the position as indicated in Figs. 1 and 2, and to hold it stationary in such position, a locking-plate F is provided, which plate is connected in any suitable manner to a shaft or rod $d$ which has its bearings in the sides of the cut-off box A and terminates at one end in a crank-handle $e$ for operating it.

The plate F serves a double purpose in that it holds the funnel shaped strainer in position and prevents it from falling forward, and also as a deflector for the water passing down into the box to prevent it from passing down between the back of the box and strainer.

When it is desired to cut-off the water and change its course from that hereinbefore described, the cut-off G is brought into position as shown in Fig. 3. When this change is made the funnel shaped strainer E is first removed from the box A by raising it up sufficiently to disengage it with the support formed by the flange $a$ and brace D, after which the cut-off G is raised to the position indicated in Fig. 3, and the funnel-shaped strainer replaced which will form a support for the cut-off.

When the cut-off is not in use it rests in an upright position against the back of the cut-off box, as shown on Fig. 2.

In practice it is desirable that the locking-plate F be rigidly connected to the end of the cut-off G and the two in turn rigidly connected to the rod $d$, so that they will both move together, but if preferred they may be independent of each other as found most preferable.

The strainer being in the shape of a funnel or receptacle for the foreign bodies coming from the water after being strained, and the facility with which it may be removed for cleaning, and also forming a support for the cut-off when the strainer is not in use, are considered of material value in rendering the cut-off attachment practical and effective; also the locking plate is a feature that is of importance when the funnel-shaped strainer is in use.

Having now fully described my invention, what I claim as new, and desire to secure by Letters Patent, is—

1. A cut-off and strainer attachment to a rain-water spout, consisting of a suitable box having an open front, a cut-off pivotally connected thereto, a removable funnel-shaped strainer which forms a support for the cut-off when the strainer is not in use, substantially as and for the purpose set forth.

2. A cut-off and strainer attachment to rain-water spouts, consisting of a suitable box provided with an open front having an outwardly extending support having an inclined flange and brace, a pivoted cut-off, and a removable funnel-shaped strainer which forms a support for the cut-off when in use, substantially as and for the purpose specified.

3. A cut-off and strainer attachment for rain-water spouts, consisting of a suitable box, having an open front and support with inclined flange and brace, a removable funnel shaped strainer, a cut-off and a locking plate connected to a rod having its bearings in the sides of the box, substantially as and for the purpose described.

In testimony that I claim the above I have hereunto subscribed my name in the presence of two witnesses.

ALFRED H. BARTH.

Witnesses:
R. E. SHAW,
C. S. FRAME.